G. A. FOX.
CLOSURE DEVICE FOR EGG CRATES.
APPLICATION FILED NOV. 10, 1921.
1,436,440.
Patented Nov. 21, 1922.
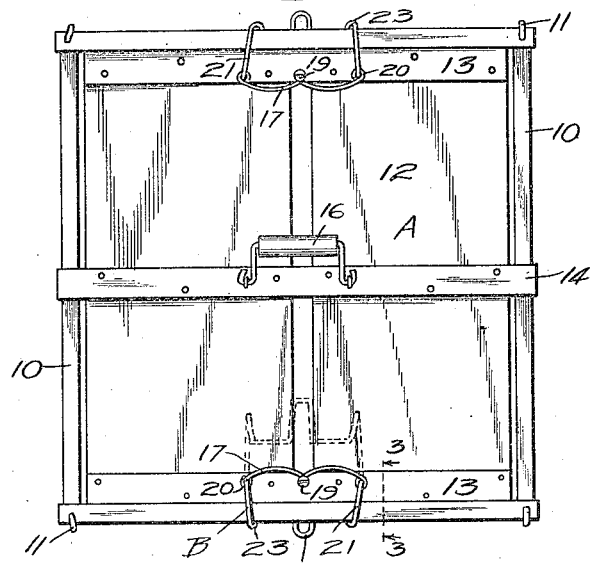
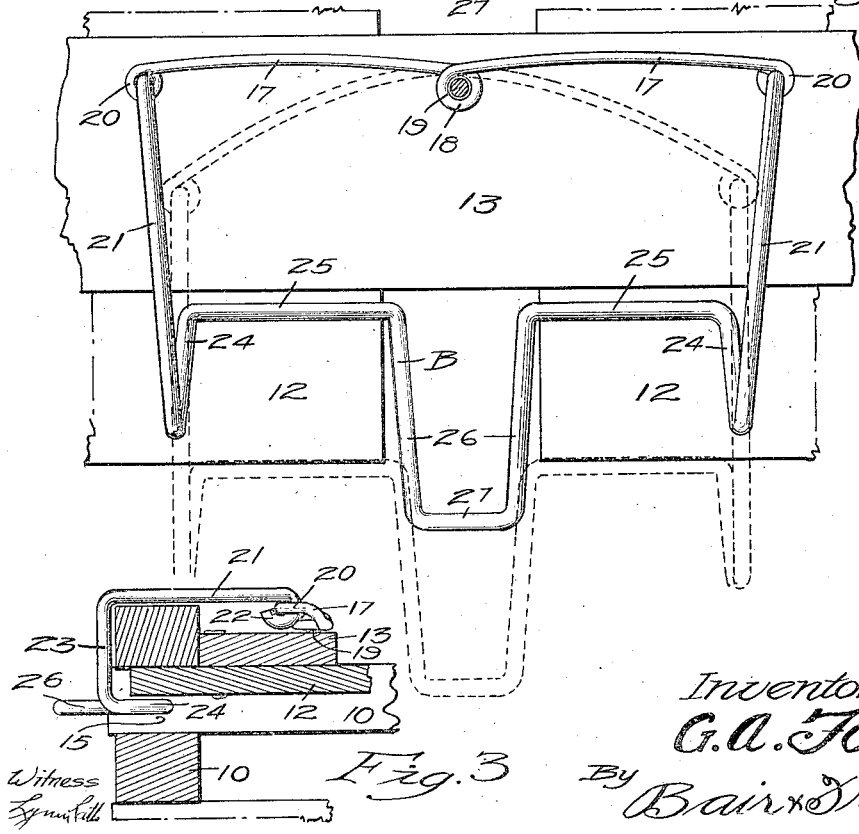

Patented Nov. 21, 1922.

1,436,440

UNITED STATES PATENT OFFICE.

GEORGE A. FOX, OF QUIMBY, IOWA.

CLOSURE DEVICE FOR EGG CRATES.

Application filed November 10, 1921. Serial No. 514,332.

*To all whom it may concern:*

Be it known that I, GEORGE A. Fox, a citizen of the United States, and a resident of Quimby, in the county of Cherokee and State of Iowa, have invented a certain new and useful Closure Device for Egg Crates, of which the following is a specification.

The object of my invention is to provide a closure device for an egg crate or the like of simple, durable and comparatively inexpensive construction.

More particularly, my invention relates to a closure member adapted to be used in combination with an egg crate and a cover therefor for holding the cover against any movement relative to the egg crate.

In the type of egg crates upon which my closure member is designed to be used the cover is slid into a pair of openings provided in the crate, so that the cover will be properly positioned with relation to the crate. My closure device is designed to extend over the ends of the cover and over the upper edge of the crate for securely holding the cover against any possible accidental sliding movement.

In this type of crate, the cover is provided with a handle and the entire crate is carried from place to place by engaging the handle.

When the crate becomes worn, and the parts give to a certain extent, it sometimes occurs that the cover will slide out of the openings provided for that purpose, thus permitting the crate to drop.

The object of my invention is to provide against any possible accidental sliding movement of the cover from the crate.

Still another object is to provide a closure device capable of being swung to position where it will not interfere with the ordinary manipulation of the crate.

Still another object is to provide the parts of yielding material, so that they may be easily made to fit upon covers and crates where the parts are irregular and vary somewhat in size and thickness.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a top view of an egg crate with a cover thereon with my closure device secured thereto shown in operative position.

Figure 2 is an enlarged view of one of the closure devices, one of its positions being shown in dotted lines; and Figure 3 is a detail, sectional view taken on the line 3—3 of Figure 1, showing the closure device in its operative position.

In the accompanying drawings, I have used the reference numeral 10 to indicate an ordinary egg crate, which is composed of a series of strips of material, the ends of one of the sides resting upon the ends of the opposite sides, and connected together by means of wires 11 extended vertically through the ends of one of the sides and the ends of the corresponding side.

A cover A for the crate 10 is provided. The cover A includes a pair of flat boards or the like 12, which may be slightly spaced apart and have cross bars 13 fixed thereto adjacent to the ends of the boards 12. The ends of the cross bars 13 terminate flush with the sides of the boards 12, as clearly illustrated in Figure 1. A cross bar 14 is provided and secured to the boards 12. The cross bar 14 is arranged midway between the two cross bars 13, and has its ends project out beyond the side edges of the boards 12.

The arrangement of the crate 10 by the use of slats spaced apart forms an opening 15 in two of the sides of the crate. The cover member A is designed to have its ends project into the openings 15 for holding the cover in position. The cross pieces 13 are designed to rest against two of the sides of the crate 10 on the inner side thereof for preventing to a certain extent any sliding movement of the cover.

When it is desired to insert the cover member in position, one end of the cover member is slid downwardly, so that the cross piece 13 as well as the ends of the boards 12 are received in the openings 15. Then by sliding the cover A in the opposite direction, the parts will spring to position where each of the cross pieces 13 will rest against the inner surfaces of two of the sides of the crate 10.

The cover member A is provided with a handle 16, which is hingedly connected to the cross piece 14. The crate is carried from place to place by the use of the handle 16.

In a great many cases when the crate has been used quite a bit, the parts become worn to a certain extent, and it is very easy for the cross piece 13 to slip into the opening 15, thereby freeing the opposite end from engagement with the side of the crate, and causing the crate to be dropped.

My invention to prevent any such accidental displacement of the cover A includes a yielding rod 17 fixed to the cross pieces 13. One of my closure devices is secured to each of the cross pieces 13. The rod 17 is provided with a loop 18 at a point midway between its ends. A screw 19 extends into the cross piece 13 and through the loop 18. The rod 17 is thus secured to the cross piece 13 and to the cover. The rod 17 is provided with a pair of bowed portions, and has its outer ends formed with loops 20. The rod 17 is made of strong spring material.

From the construction of the parts just described, it will be seen that the screw 19 serves as a means for anchoring the rod 17 to the cover and at the same time serves as a pivot to permit movement of the rod 17 at its ends without effecting the center of the rod.

The normal position of the rod 17 is shown in solid lines in Figures 1 and 2 of the drawings.

Secured to each of the rods 17 and the loops 20 is a yoke device B. The yoke device B includes a pair of arms 21, having loops 22 formed on its inner ends, the loops 22 being extended through the loops 20 of the rod 17, whereby the yoke device may be pivotally or swingingly secured to the rod 17. The arms 21 of each of the yoke devices B are provided with downwardly extending portions 23, as clearly illustrated in Figure 3 of the drawings.

The lower ends of the downwardly extending portions 23 are then provided with inwardly extending portions 24. The arms 21, the downwardly extending portions 23 and the inwardly extending portions 24 form what I call the yoke portion of my device.

The inner ends of the inwardly extending portions 24 are connected together by a rod 25. The rod 25 has its intermediate portion formed with a pair of outwardly extending rods or portions 26 connected together by the cross piece 27. The portions 26 and the connecting piece 27 form the finger engaging member of my device, the purpose of which will be hereafter more fully set forth.

Having described the arrangement of the closure members, I will now describe their use.

After the cover member A has been placed in position as shown in Figure 1 of the drawing, the closure devices are in the position shown in dotted lines in Figure 1. The finger engaging portion of the yoke device B is then engaged and the parts are swung over the outer upper edge of the sides of the crate.

In order to permit the rods 25 to clear the upper edge of the sides of the crate, it is necessary to pull the entire yoke device outwardly against the action of the yielding rod 17.

When the yoke device B is pulled outwardly, it is moved to position as substantially shown in dotted lines in Figure 2 of the drawings.

After the rod 25 has passed around the corner 28 of the sides of the crate, the entire yoke device is then swung downwardly, the loops 20 and 22 forming the axis.

When the parts have been moved to the position shown in dotted lines in Figure 2 of the drawings and then swung downwardly, the inwardly extending portions 24 and rods 25 will then move inwardly due to the fact that the rod 17 will move back to its normal position, as shown in solid lines in Figure 2 of the drawings.

As soon as the parts are returned to their normal position, then the yoke, as heretofore described, will receive one of the cross pieces of the sides and the end of the cover member A. When each of the closure devices have been moved to their operative position, it will be seen that no sliding movement of the cover A could then possibly occur.

The sliding movement in one direction would be prevented by the closure device on the opposite side of the crate or vice versa.

The entire yoke device B is made of substantially strong material, so that it will not easily give or bend, while the rod 17 is preferably made of strong spring material, so as to easily give when desired.

When it is desired to release the closure devices, the finger engaging portion is gripped and the entire yoke device B is then pulled outwardly, so as to permit the entire yoke device to be swung around past the corner 28 of the crate.

The entire yoke device may then be swung to position shown in dotted lines in Figure 1 of the drawings, so as not to interfere with the ordinary manipulation of the cover member.

It will be seen that I have provided a closure device which may be easily moved to operative or inoperative position, and when once moved to operative position will be very effective for preventing any accidental displacement of the cover member.

Some changes may be made in the construction and arrangement of the various parts of my device, without departing from the essential features and purposes of my invention, and it is my intention to cover by my claims, any modified forms of structure or use of mechanical equivalents, which may be reasonably included within their scope.

I claim as my invention:

1. In combination with a crate and a cover therefor, a closure member secured to the cover adjacent to one edge thereof, including a yielding member fixed at its center and a yoke device secured to the ends of said yielding member adapted to extend over the end of the crate and the end of the cover for holding them together.

2. In combination with a crate and a cover therefor, adapted to have its ends received in openings formed in two of the sides of the crate and a closure member for holding the cover against accidental displacement including a yoke device pivotally secured to the cover member and capable of being swung to position where it will lap over the upper end of one of the sides and one of the ends of the cover for holding them against movement.

3. In combination with a crate and a cover therefor adapted to have its ends received in openings formed in two of the sides of the crate and a closure member for holding the cover against accidental displacement including a yielding yoke device pivotally secured to the cover member and capable of being swung to position where it will lap over the upper end of one of the sides and one of the ends of the cover for holding them against movement.

4. In combination with a crate and a cover therefor adapted to have its ends received in openings formed in two of the sides of the crate and a closure member for holding the cover against accidental displacement including a yielding rod secured to said cover member, and a yoke device pivotally secured to said yielding rod, and capable of being swung to position where it will lap over the upper end of one of the sides and one of the ends of the cover for holding them against movement.

5. In combination with a crate and a cover therefor adapted to have its ends received in openings formed in two of the sides of the crate and a closure member for holding the cover against accidental displacement including a pair of yielding rods secured to the cover adjacent to the ends received in the openings in the crate, a pair of yoke devices pivotally secured to said yielding rods, each of said yoke devices having a portion adapted to receive therebetween the upper end of the side of the crate and the end of the cover for holding them against undesired movement.

6. In combination with a crate and a cover therefor adapted to have its ends received in openings formed in two of the sides of the crate and a closure member for holding the cover against accidental displacement including a pair of yielding rods secured to the cover adjacent to the ends received in the openings in the crate, a pair of yoke devices pivotally secured to said yielding rods, each of said yoke devices having a portion adapted to receive therebetween the upper end of the side of the crate and the end of the cover for holding them against undesired movement, and a finger engaging portion formed on said yoke device, whereby it may be engaged.

7. In combination with a crate and a cover therefor adapted to have its ends received in openings formed in two of the sides of the crate and a closure member for holding the cover against accidental displacement including a yielding rod pivotally secured at its center to the cover member, loops formed on the ends of said rod, a yoke device having loops formed on its ends, the loops of said yoke being connected to the loops on said rod, whereby the parts are pivotally connected together, said yoke device being capable of being swung to position where it will lap over the upper end of one of the sides of said crate, and one of the ends of the cover for holding them together.

8. In combination with a crate and a cover therefor adapted to have its ends received in openings formed in two of the sides of the crate and a closure member for holding the cover against accidental displacement including a yielding rod pivotally secured at its center to the cover member, loops formed on the ends of said rod, a yoke device having loops formed on its ends, the loops of said yoke being connected to the loops on said rod, whereby the parts are pivotally connected together, said yoke device being capable of being swung to position where it will lap over the upper end of one of the sides of said crate, and one of the ends of the cover for holding them together or swung to position away from the end of the cover, so as to permit the cover to be slid into or out of engagement with the crate for the purposes specified.

9. In combination with a crate and a cover therefor adapted to have its ends received in openings formed in two of the sides of the crate and a closure member for holding the cover against accidental displacement including a yielding rod pivotally secured at its center to the cover member, loops formed on the ends of said rod, a yoke device having loops formed on its ends, the loops of said yoke being connected to the loops on said rod, whereby the parts are pivotally connected together, the parts being so arranged that the yoke device may be drawn against the action of the yielding rod out over the upper end of the crate and then lowered to position where it will receive a portion of the crate and cover due to the inward pull of the yielding rod as specified.

Des Moines, Iowa, October 26, 1921.

GEORGE A. FOX.